G. Craine,
Sawing Shingles.
N° 15,756.  Patented Sep. 23, 1856.
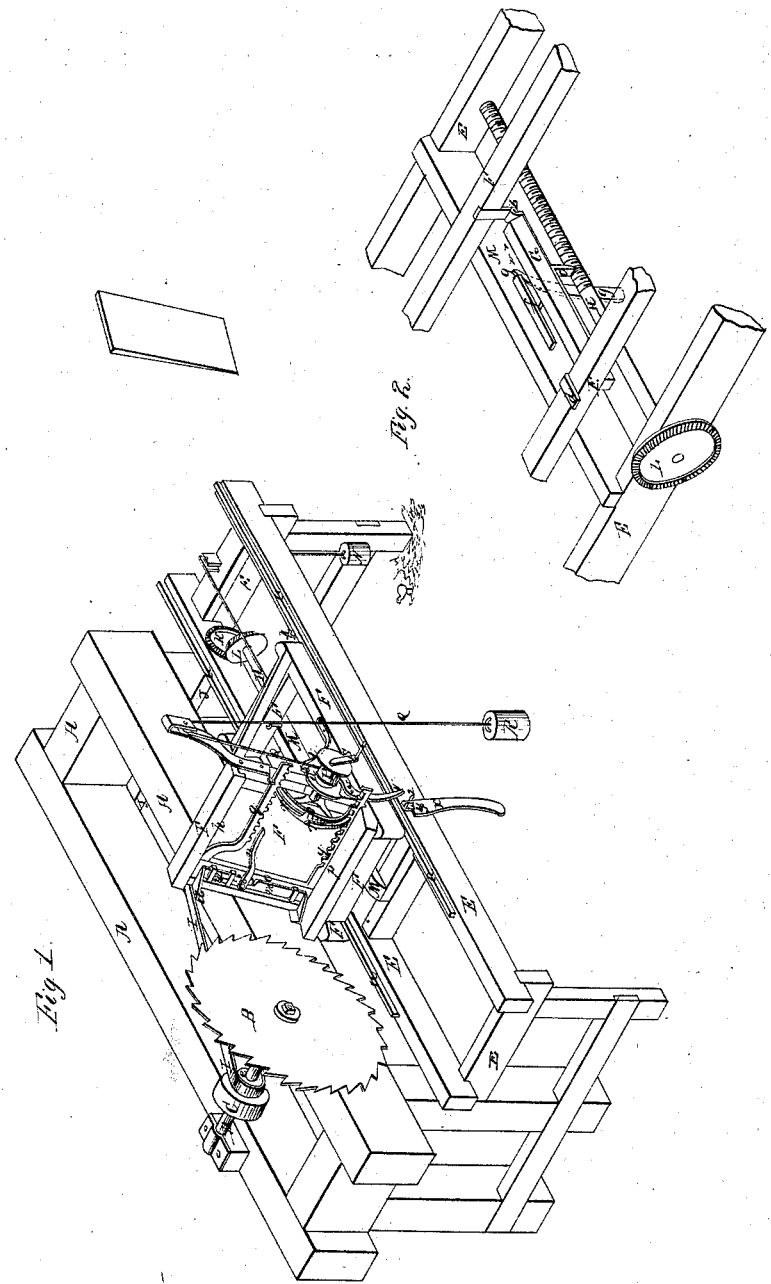

UNITED STATES PATENT OFFICE.

GEO. CRAINE, OF FAIRFIELD, IOWA.

METHOD OF FEEDING AND SAWING SHINGLES.

Specification of Letters Patent No. 15,756, dated September 23, 1856.

*To all whom it may concern:*

Be it known that I, GEORGE CRAINE, of Fairfield, in the county of Jefferson and State of Iowa, have invented certain new and useful Improvements in Machines for Sawing Shingles, and that the following is a full, clear, and exact description of the same, reference being had to the accompanying drawings, making a part thereof in which—

Figure 1, represents a perspective view of the entire machine, and Fig. 2, represents in perspective a view of that part of the machine not clearly seen in Fig. 1.

Similar letters where they occur in the two figures denote like parts in both.

To enable others skilled in the art to make and use my invention, I will proceed to describe the same with reference to the drawings.

A, represents a substantial frame or table, on which is hung a circular saw B, that may be driven from any first moving power, by an endless belt passing around the pulley C, on the saw shaft D.

E, is a second frame or table, connected to the main frame A, having ways $a$, $a$, upon it, on which the carriage F, traverses, as will be hereafter described. To the front end of the carriage, and on its under side, is hinged at $b$, Fig. 2, a piece G, which has upon it a projecting knife-edge $c$, (or it may be a semi-screw nut) which takes into the threads on the screw shaft H, for feeding the carriage, with the bolt or block upon it, up to, and past, the front of the saw sufficiently far to cut off a shingle from it. The rear end of the piece G, has a hooked or bent piece $d$, upon it, which projects over the rear transverse sill of the carriage F. The object in thus hanging the piece G, is that it may rise vertically to disconnect the piece $c$, from the thread on the screw shaft, when the carriage is to be run back, and to prevent it from falling too far, when the said piece $c$, is to take into the screw threads on H, to feed forward the carriage and bolt upon it.

From a small pulley $e$ on the saw shaft D, passes an endless belt I, to and around another pulley on the shaft J; and on the end of the shaft J, is a bevel gear wheel K, which meshes with, and gives motion to, a similar bevel wheel L, on the end of the screw shaft H, to give motion to said screw shaft, and through it, by the means above described, to the carriage F.

On a stationary longitudinal piece M, attached to the frame E, is a ledge $f$; and passing through, or affixed to, the hinged portion G, is a stud or pin $i$ which travels underneath said ledge when the carriage is being fed toward the saw, and holds the feeding tooth $c$, in the screw thread on the shaft H. At or about the end of the ledge $f$, and at the extreme end of the forward movement of the carriage, which when feeding up the bolt to the saw, moves in the direction of the red arrow in Fig. 2, is a pivoted trigger $g$, connected to M. When the stud or pin $i$, arrives at the end of the ledge $f$, it strikes against the trigger $g$, and said trigger raises the piece G, up, taking the feeding tooth $c$, out of the screw thread—the pin $i$, is then raised to the top of the ledge $f$, and the moment the disconnection is made, a falling weight N, which had been previously raised up by the forward motion of the carriage, runs said carriage back for the next similar operation. And should it be necessary to stop the carriage at the end of its backward motion, it may be done by a small slide which can be run out to catch the pin $i$, and hold it up, to prevent its dropping down, and throwing the feed in gear, until ready to start again. A pin $k$, may also be set on the frame E, to stop the carriage when it has run back the required distance, to change again into a forward motion.

$l$, $l$, are two dogs, for holding the bolt or block, from which the shingles are to be sawed, to the carriage. The shanks $m$, $m$, of these dogs, are so united to a lever $n$, as that they may, by said lever, force the dogs into, or take them out of, the bolt at pleasure. The dogs, shanks, and lever above mentioned are arranged on a cross head $o$, which projects into grooves or guides formed by the pieces $p$, $p$, at the top and bottom of the carriage.

$q$, $q$, are two racks, extending across the carriage, and pivoted respectively to the top and bottom of the cross head $o$. At the opposite side of the carriage, from the dogs $l$, is arranged upon a shaft upon which it may freely turn a wheel O, having upon its periphery a worm or section of a screw ($r$)—the diameter of said wheel being such as to cause its worm or screw $r$, to take into the teeth of both the racks $q$, $q$, and so that said worm will, alternately, when motion is given to it, move up the cross-head, first one end and then the other one, so as to take the shingle from the bolt "butt and point" as it is termed, or to compensate for the wedge form or shape of the shingle.

Around a drum P, arranged on the shaft of the worm O, is wound a cord or chain Q, having a weight R connected to it; this cord and weight is wound up by a winch S, and held by a dog $s$, which is pressed by a spring $t$ into or against a ratchet $u$ also connected to the shaft of the worm wheel. The dog or pawl $s$, has a lever $v$ hanging down below its fulcra $w$, which lever as the carriage goes forward slips past a trigger $x$, without affecting its pawl, as said trigger is merely turned on its pivot $y$. But when the carriage runs back, the point of the lever $v$, strikes against a projection $z$, on the trigger $x$, and as the trigger cannot move in that direction owing to the stop 2 behind it, the pawl $v$, is thrown out from the ratchet $u$, and the falling weight R, turns the wheel O, and shifts and feeds up the bolt for another shingle. The rotation of the wheel is checked by the pawl $s$, taking into the next succeeding tooth in the ratchet $u$, each movement of the wheel being sufficient to feed the bolt properly to the saw.

The carriage F, may move on its ways by friction rollers, which causes it to work freely; and the face of the carriage or that part which holds the bolt, should have a rearward inclination, of about 34 degrees from a vertical line. The object of this inclination is as follows: When the saw is allowed to strike into the end of the bolt, it splits, fractures, or roughens the thin ends of the shingles; and the same defect exists when leaving the bolt, if allowed to leave it abruptly. By my arrangement of parts, the saw strikes the bolt, at about the mid-length of the shingle, and cuts toward both ends of the shingle in curved lines, as shown at T, which may represent one of the shingles:—the saw strikes or enters at 3, and the series of concentric lines show the action of the saw in going through the bolt, and especially the direction in which the series of cuts leave the bolt. By this means I take off shingles perfectly smooth and unbroken, which is very desirable, and a matter not heretofore perfectly done by any other machine of which I have knowledge. It will be perceived that by this plan there is always a portion of the wood which connects the shingle to the bolt, until the saw nearly cuts through the whole bolt. The customary way is to saw from one end of the bolt to the other, which as before stated makes many bad and imperfect ends. I cut as it were from the center of the bolt toward both the ends at the same time, by which I perfect the operation, and avoid the damage to the points or ends of the shingles.

Having thus fully described the nature of my invention what I claim therein as new and desire to secure by Letters Patent is—

1. So arranging the carriage with regard to the saw as the saw shall enter the bolt at or near the center in length of the shingle, and cut toward both its ends at the same time, in manner and for the purpose set forth.

2. I also claim as a device, for feeding the bolt to the saw, so as to take the shingles therefrom "butt and point" alternately, the worm wheel O, working into the double racks $q$, $q$, in the manner set forth.

3. I also claim the combination of the hinged piece G, with its pin $i$ and feeding tooth $c$, and the ledge $f$, and trigger $g$, on the fixed piece M, for the purpose of connecting and disconnecting at proper times, the carriage with the feeding shaft H, so that it may traverse on its ways as set forth.

GEORGE CRAINE.

Witnesses:
 BOURHART HENN,
 L. E. JAMES.